(12) United States Patent
Chidlovskii

(10) Patent No.: US 11,600,017 B2
(45) Date of Patent: Mar. 7, 2023

(54) ADVERSARIAL SCENE ADAPTATION FOR CAMERA POSE REGRESSION

(71) Applicants: NAVER CORPORATION, Gyeonggi-do (KR); NAVER LABS CORPORATION, Gyeonggi-do (KR)

(72) Inventor: Boris Chidlovskii, Meylan (FR)

(73) Assignees: NAVER CORPORATION, Gyeonggi-Do (KR); NAVER LABS CORPORATION, Gyeonggi-Do (KR)

( * ) Notice: Subject to any disclaimer, the term of this patent is extended or adjusted under 35 U.S.C. 154(b) by 298 days.

(21) Appl. No.: 16/861,838

(22) Filed: Apr. 29, 2020

(65) Prior Publication Data

US 2021/0343043 A1 Nov. 4, 2021

(51) Int. Cl.
*G06T 7/73* (2017.01)
*G06T 3/00* (2006.01)

(52) U.S. Cl.
CPC .............. *G06T 7/75* (2017.01); *G06T 3/0075* (2013.01); *G06T 3/0093* (2013.01); *G06T 2207/20081* (2013.01); *G06T 2207/30244* (2013.01)

(58) Field of Classification Search
CPC ....... G06T 7/75; G06T 3/0075; G06T 3/0093; G06T 2207/20081; G06T 2207/30244
See application file for complete search history.

(56) References Cited

U.S. PATENT DOCUMENTS

| 10,984,545 | B2 * | 4/2021 | Gu ........................ G06N 3/0454 |
| 2015/0010202 | A1 * | 1/2015 | Tuzel ...................... G06V 20/64 |
| | | | 382/103 |
| 2018/0253108 | A1 * | 9/2018 | Heinla ............... G06Q 10/0833 |
| 2019/0050999 | A1 * | 2/2019 | Piat ....................... G06K 9/6232 |
| 2020/0089966 | A1 * | 3/2020 | Tsai ...................... G06V 10/774 |
| 2020/0363815 | A1 * | 11/2020 | Mousavian .......... G06N 3/0454 |
| 2021/0035325 | A1 * | 2/2021 | Yang ......................... G06T 7/73 |
| 2021/0125036 | A1 * | 4/2021 | Tremblay ............. G06V 30/194 |

(Continued)

FOREIGN PATENT DOCUMENTS

| CN | 108062753 A | * | 5/2018 | ............... G06T 7/10 |
| CN | 113343356 A | * | 9/2021 | |
| WO | WO-2022083200 A1 | * | 4/2022 | ......... G06K 9/00268 |

OTHER PUBLICATIONS

Balntas, V., Li, S., Prisacariu, V.: Relocnet: continuous metric learning relocalisation using neural nets. In: European Conference Computer Vision (ECCV), pp. 782-799 (2018).

(Continued)

*Primary Examiner* — Charles T Shedrick

(57) ABSTRACT

A pose estimation training system includes: a first model configured to generate a first 6 degrees of freedom (DoF) pose of a first camera that captured a first image from a first domain; a second model configured to generate a second 6 DoF pose of a second camera that captured a second image from a second domain, where the second domain is different than the first domain; a discriminator module configured to, based on first and second outputs from the first and second encoder modules, generate a discriminator output indicative of whether the first and second images are from the same domain; and a training control module configured to, based on the discriminator output, selectively adjust at least one weight value shared by the first model and the second model.

24 Claims, 10 Drawing Sheets

(56) References Cited

U.S. PATENT DOCUMENTS

| | | | | |
|---|---|---|---|---|
| 2021/0209797 | A1* | 7/2021 | Lee | G06T 17/00 |
| 2021/0287018 | A1* | 9/2021 | Yoo | G06T 7/11 |
| 2021/0312655 | A1* | 10/2021 | Tang | G06T 7/74 |
| 2021/0343043 | A1* | 11/2021 | Chidlovskii | G06T 3/0075 |
| 2021/0397855 | A1* | 12/2021 | Guizilini | G06T 7/10 |
| 2021/0407086 | A1* | 12/2021 | Liu | G06T 7/174 |
| 2022/0084231 | A1* | 3/2022 | Guizilini | G06T 15/205 |
| 2022/0300770 | A1* | 9/2022 | Zakharov | G06T 17/00 |

OTHER PUBLICATIONS

Borchani, H., Varando, G., Bielza, C., Larrānaga, P.: A survey on multi-output regression. Wiley Int. Rev. Data Min. Knowl. Disc. 5(5), 216-233 (2015).

Boris Chidlovskii, Assem Sadek. "Adversarial Transfer of Pose Estimation Regression", published in Bartoli A., Fusiello A. (eds) Computer Vision—ECCV 2020 Workshops. ECCV 2020. Lecture Notes in Computer Science, vol. 12535, 2020.

Boris Chidlovskii, Assem Sadek. "Adversarial Transfer of Pose Estimation Regression", published on arXiv.org as arXiv:2006.11658, Jun. 20, 2020.

Boris Chidlovskii, Assem Sadek. "Adversarial Transfer of Pose Estimation Regression", published on arXiv.org as arXiv:2006.11658v2, Nov. 23, 2020.

Bui, M., Baur, C., Navab, N., Ilic, S., Albarqouni, S.: Adversarial networks for camera pose regression and refinement. In: ICCV Workshops, vol. 2019, pp. 3778-3787 (2019).

Chen, X., Monfort, M., Liu, A., Ziebart, B.D.: Robust covariate shift regression. Proc. AISTATS. 51, 1270-1279 (2016).

Chen, X., Wang, S., Long, M., Wang, J.: Transferability vs. discriminability: batch spectral penalization for adversarial domain adaptation. In: International Conference on Machine Learning (ICML), vol. 97, pp. 1081-1090 (2019).

Gidaris, S., Singh, P., Komodakis, N.: Unsupervised representation learning by predictingimage rotations. In: International Conference on Learning Representation (ICLR) (2018).

Kolesnikov, A., Zhai, X., Beyer, L.: Revisiting self-supervised visual representation learning. In: Computer Vision Pattern Recognition (CVPR), pp. 1920-1929 (2019).

Lathuilière, S., Mesejo, P., Alameda-Pineda, X., Horaud, R.: A comprehensive analysis of deep regression. CoRR 1803.08450 (2018).

Melekhov, I., Ylioinas, J., Kannala, J., Rahtu, E.: Relative Camera Pose Estimation Using Convolutional Neural Networks. CoRR 1702.01381 (2017).

Yang, L., Bai, Z., Tang, C., Li, H., Furukawa, Y., Tan, P.: Sanet: scene agnostic network for camera localization. In: European Conference Computer Vision (ECCV), pp. 42-51 (2019).

Abhinav Valada, Noha Radwan,and Wolfram Burgard. Deep auxiliary learning for visual localization and odometry. In 2018 IEEE International Conference on Robotics and Automation, ICRA 2018, Brisbane, Australia, May 21-25, 2018, pp. 6939-6946, 2018.

Albert Gordo, Jon Almaz'an, J'er^ome Revaud, and Diane Larlus. Deep image retrieval: Learning global representations for image search. In European Conference Computer Vision (ECCV), pp. 241-257, 2016.

Alex Kendall and Roberto Cipolla. Geometric Loss Functions for Camera Pose Regression with Deep Learning. In Computer Vision Pattern Recognition (CVPR), pp. 6555-6564, Honolulu, HI, 2017.

Alex Kendall and Roberto Cipolla. Modelling uncertainty in deep learning for camera relocalization. In 2016 IEEE International Conference on Robotics and Automation, ICRA 2016, Stockholm, Sweden, May 16-21, 2016, pp. 4762-4769, 2016.

Alex Kendall, Matthew Grimes, and Roberto Cipolla. PoseNet: A Convolutional Network for Real-Time 6-DOF Camera Relocalization. May 2015.

Alex Krizhevsky, Ilya Sutskever, and Geoffrey E. Hinton. Imagenet classification with deep convolutional neural networks. In Neural Information Processing Systems (NeurIPS), pp. 1106-1114, 2012.

Antonio Torralba and Alexei A. Efros. Unbiased look at dataset bias. In Computer Vision Pattern Recognition (CVPR), pp. 1521-1528, 2011.

C. Leng, H. Zhang, B. Li, G. Cai, Z. Pei, and L. He. Local feature descriptor for image matching: A survey. IEEE Access, 7:6424-6434, 2019.

Corinna Cortes and Mehryar Mohri. Domain adaptation in regression. In Proc. 22nd Intern. Conf. on Algorithmic Learning Theory, 2011.

Eric Brachmann and Carsten Rother. Learning less is more—6d camera localization via 3d surface regression. In Computer Vision Pattern Recognition (CVPR), pp. 4654-4662, 2018.

Eric Brachmann, Alexander Krull, Sebastian Nowozin, Jamie Shotton, Frank Michel, Stefan Gumhold, and Carsten Rother. DSAC—differentiable RANSAC for camera localization. In Computer Vision Pattern Recognition (CVPR), pp. 2492-2500, 2017.

Ethan Rublee, Vincent Rabaud, Kurt Konolige, and Gary R. Bradski. ORB: an efficient alternative to SIFT or SURF. In Intern. Conference Computer Vision (ICCV), pp. 2564-2571, 2011.

Florian Walch, Caner Hazirbas, Laura Leal-Taix'e, Torsten Sattler, Sebastian Hilsenbeck, and Daniel Cremers. Image-based localization using lstms for structured feature correlation. In Intern. Conference Computer Vision (ICCV), pp. 627-637, 2017.

Gabriela Csurka. A comprehensive survey on domain adaptation for visual applications. In Domain Adaptation in Computer Vision Applications., pp. 1-35. 2017.

Hyeonwoo Noh, Seunghoon Hong, and Bohyung Han. Learning deconvolution network for semantic segmentation, pp. 1520-1528, 2015.

Jamie Shotton, Ben Glocker, Christopher Zach, Shahram Izadi, Antonio Criminisi, and Andrew W. Fitzgibbon. Scene coordinate regression forests for camera relocalization in RGB-D images. In Computer Vision Pattern Recognition (CVPR), pp. 2930-2937, 2013.

Judy Hoffman, Erik Rodner, Jeff Donahue, Trevor Darrell, and Kate Saenko. Efficient learning of domain-invariant image representations. CoRR, arXiv:1301.3224, 2013.

Kaichao You, Mingsheng Long, Zhangjie Cao, Jianmin Wang, and Michael I. Jordan. Universal Domain Adaptation. In Computer Vision Pattern Recognition (CVPR), pp. 2720-2729, 2019.

Kuniaki Saito, Shohei Yamamoto, Yoshitaka Ushiku, and Tatsuya Harada. Open set domain adaptation by backpropagation. In European Conference Computer Vision (ECCV), pp. 153-168, 2018.

Mei Wang and Weihong Deng. Deep visual domain adaptation: A survey. Neurocomputing, 312:135-153, 2018.

Mingsheng Long, Jianmin Wang, Guiguang Ding, Jiaguang Sun, and Philip S. Yu. Transfer joint matching for unsupervised domain adaptation. In Computer Vision Pattern Recognition (CVPR), 2014.

Mingsheng Long, Yue Cao, Jianmin Wang, and Michael I. Jordan. Learning transferable features with deep adaptation networks. In Intern. Conference Machine Learning (ICML), 2015.

N. Radwan, A. Valada, and W. Burgard. Vlocnet++: Deep multitask learning for semantic visual localization and odometry. IEEE Robotics and Automation Letters, 3(4):4407-4414, Oct. 2018.

Qunjie Zhou, Torsten Sattler, Marc Pollefeys, and Laura Leal-Taixe. To learn or not to learn: Visual localization from essential matrices. CoRR, abs/1908.01293, 2019.

Samarth Brahmbhatt, Jinwei Gu, Kihwan Kim, James Hays, and Jan Kautz. Geometry-aware learning of maps for camera localization. In Computer Vision Pattern Recognition (CVPR), pp. 2616-2625, 2018.

Torsten Sattler, Qunjie Zhou, Marc Pollefeys, and Laura Leal-Taixe. Understanding the Limitations of CNN-based Absolute Camera Pose Regression. In Computer Vision Pattern Recognition (CVPR), Mar. 2019.

Yang Zhang, Philip David, and Boqing Gong. Curriculum domain adaptation for semantic segmentation of urban scenes. In Intern. Conference Computer Vision (ICCV), pp. 2039-2049, 2017.

Yaroslav Ganin, Evgeniya Ustinova, Hana Ajakan, Pascal Germain, Hugo Larochelle, Francois Laviolette, Mario Marchand, and Victor

(56) References Cited

OTHER PUBLICATIONS

S. Lempitsky. Domain-adversarial training of neural networks. J. Mach. Learn. Res., 17:59:1-59:35, 2016.

Yoli Shavit and Ron Ferens. Introduction to Camera Pose Estimation with Deep Learning. CoRR, 1907.05272, 2019.

Zakaria Laskar, Iaroslav Melekhov, Surya Kalla, and Juho Kannala. Camera Relocalization by Computing Pairwise Relative Poses Using Convolutional Neural Network. In 2017 IEEE International Conference on Computer Vision Workshops, ICCV Workshops 2017, Venice, Italy, Oct. 22-29, 2017, pp. 929-938, 2017.

Zhangjie Cao, Kaichao You, Mingsheng Long, Jianmin Wang, and Qiang Yang. Learning to transfer examples for partial domain adaptation. In Computer Vision Pattern Recognition (CVPR), 2019.

Zhangjie Cao, Lijia Ma, Mingsheng Long, and Jianmin Wang. Partial adversarial domain adaptation. In European Conference Computer Vision (ECCV), pp. 139-155, 2018.

Saha, S., Varma, G., Jawahar, C.V.: Improved visual relocalization by discovering anchor points. In: British Machine Computer Vision (BMVC), p. 164 (2018).

\* cited by examiner

ADVERSARIAL SCENE ADAPTATION FOR CAMERA POSE REGRESSION

FIELD

The present disclosure relates to visual navigation and more particularly to systems and methods for camera pose regression.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Navigating robots are mobile robots that may be trained to navigate environments without colliding with objects during travel. Navigating robots may be trained in the environment in which they will operate or trained to operate regardless of environment.

Navigating robots may be used in various different industries. One example of a navigating robot is a package handler robot that navigates an indoor space (e.g., a warehouse) to move one or more packages to a destination location. Another example of a navigating robot is an autonomous vehicle that navigates an outdoor space (e.g., roadways) to move one or more occupants from a pickup to a destination.

SUMMARY

In a feature, a training system is described. A first model includes: a first encoder module configured to generate a first vector representation based on a first image from a first domain using first weight values; a first localizer module configured to generate a second vector representation based on the first vector representation; and a first regressor module configured to generate a first 6 degrees of freedom (DoF) pose of a first camera that captured the first image based on the second vector representation using second weight values. A second model includes: a second encoder module configured to generate a third vector representation based on a second image from a second domain using the first weight values, where the second domain is different than the first domain; a second localizer module configured to generate a fourth vector representation based on the third vector representation; and a second regressor module configured to generate a second 6 DoF pose of a second camera that captured the second image based on the fourth vector representation and using the second weight values. A discriminator module is configured to, based on first and second outputs from the first and second encoder modules, generate a discriminator output indicative of whether the first and second images are from the same domain, and a training control module is configured to, until the discriminator output indicates that the first and second images are from the same domain, selectively adjust at least one of: at least one of the first weight values; and at least one of the second weight values.

In further features, the training control module is configured to adjust at least one of the first weight values until the discriminator output indicates that the first and second images are from the same domain.

In further features, the training control module is configured to input a different first image to the first model in response to the discriminator output indicating that the first and second images are from the same domain.

In further features, the training control module is configured to input a different second image to the second model in response to the discriminator output indicating that the first and second images are from the same domain.

In further features, the training control module is configured to, in response to the discriminator output indicating that the first and second images are from the same domain: apply a geometric transformation to the first image, thereby generating a geometrically transformed image; and input the geometrically transformed image to the first model.

In further features, the geometric transformation includes a rotation of the image by a predetermined angle.

In further features, the geometric transformation includes one of translation, affine warping, and distortion.

In further features, the training control module is further configured to store in memory the first model, the first weight values, and the second weight values.

In further features: the first localizer module includes at least one fully connected layers configured to map the first vector representation to the second vector representation; and the second localizer module includes the at least one fully connected layers configured to map the third vector representation to the fourth vector representation.

In further features, the first and second regressor modules each include at least two separate connected layers.

In further features, the first and second encoder modules each include an encoder and a fully connected layer localizer.

In further features, a vehicle includes: at least one propulsion device; memory including: the first model; and the first and second weight values; a camera configured to capture an image; a pose module configured to determine a 6 DoF pose of the camera based on the image and using the first model and the first and second weight values; and a control module configured to actuate the at least one propulsion device based on the 6 DoF pose of the camera.

In further features, the first and second DoF poses are absolute 6 DoF poses.

In further features, the first and second DoF poses are relative 6 DoF poses.

In further features, the training control module is configured to adjust at least one of the first weight values based on minimizing a loss of the discriminator module.

In further features, the training control module is configured to adjust at least one of the second weight values based on minimizing a loss of the first and second regressor modules.

In further features: the first 6 DoF includes: a first three dimensional position of the first camera that captured the first image; and a first three dimensional orientation of the first camera that captured the first image; and the second 6 DoF includes: a second three dimensional position of the second camera that captured the second image; and a second three dimensional orientation of the second camera that captured the second image.

In a feature, a training method includes: by a first model: generating a first vector representation based on a first image from a first domain using first weight values; generating a second vector representation based on the first vector representation; and generating a first 6 degrees of freedom (DoF) pose of a first camera that captured the first image based on the second vector representation using second weight values; by a second model: generating a third vector representation based on a second image from a second domain using the first weight values, where the second domain is different than the first domain; generating a fourth vector representation based on the third vector representation; and generating a second 6 DoF pose of a second camera that captured the second image based on the fourth vector representation and using the second weight values; based on first and second outputs from the first and second models, generating a discriminator output indicative of whether the first and second images are from the same domain; and until the discriminator output indicates that the first and second images are from the same domain, selectively adjusting at least one of: at least one of the first weight values; and at least one of the second weight values.

In a feature, a non-transitory computer readable medium includes code that, when executed by one or more processors, performs a training method, including: by a first model: generating a first vector representation based on a first image from a first domain using first weight values; generating a second vector representation based on the first vector representation; and generating a first 6 degrees of freedom (DoF) pose of a first camera that captured the first image based on the second vector representation using second weight values; by a second model: generating a third vector representation based on a second image from a second domain using the first weight values, where the second domain is different than the first domain; generating a fourth vector representation based on the third vector representation; and generating a second 6 DoF pose of a second camera that captured the second image based on the fourth vector representation and using the second weight values; based on first and second outputs from the first and second models, generating a discriminator output indicative of whether the first and second images are from the same domain; and until the discriminator output indicates that the first and second images are from the same domain, selectively adjusting at least one of: at least one of the first weight values; and at least one of the second weight values.

In a feature, a training system includes: a first means for: generating a first vector representation based on a first image from a first domain using first weight values; generating a second vector representation based on the first vector representation; and generating a first 6 degrees of freedom (DoF) pose of a first camera that captured the first image based on the second vector representation using second weight values; a second means for: generating a third vector representation based on a second image from a second domain using the first weight values, where the second domain is different than the first domain; generating a fourth vector representation based on the third vector representation; and generating a second 6 DoF pose of a second camera that captured the second image based on the fourth vector representation and using the second weight values; a third means for, based on first and second outputs from the first and second means, generating a discriminator output indicative of whether the first and second images are from the same domain; and a fourth means for, until the discriminator output indicates that the first and second images are from the same domain, selectively adjust at least one of: at least one of the first weight values; and at least one of the second weight values.

In a feature, a pose estimation training system includes: a first model configured to generate a first 6 degrees of freedom (DoF) pose of a first camera that captured a first image from a first domain; a second model configured to generate a second 6 DoF pose of a second camera that captured a second image from a second domain, where the second domain is different than the first domain; a discriminator module configured to, based on first and second outputs from the first and second encoder modules, generate a discriminator output indicative of whether the first and second images are from the same domain; and a training control module configured to, based on the discriminator output, selectively adjust at least one weight value shared by the first model and the second model.

In further features, the first model further includes: a first encoder module configured to generate a first vector representation based on the first image using first weight values; a first localizer module configured to generate a second vector representation based on the first vector representation; and a first regressor module configured to generate the first 6 degrees of freedom (DoF) pose of a first camera based on the second vector representation using second weight values.

In further features, the second model further comprises: a second encoder module configured to generate a third vector representation based on a second image using the first weight values; a second localizer module configured to generate a fourth vector representation based on the third vector representation; and a second regressor module configured to generate a second 6 DoF pose of the second camera based on the fourth vector representation and using the second weight values.

In further features, the training control module is configured to selectively adjust the first model and the second model by adjusting at least one of: at least one of the first weight values; and at least one of the second weight values.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Visual navigation of mobile robots combines the domains of vision and control. Navigation can be described as finding a suitable and non-obstructed path between a starting location and a destination location. A navigating robot includes a control module configured to move the navigating robot based on input from one or more sensors (e.g., cameras) using a trained model. The present application involves adversarial training of the trained model for domain adaptation.

Figure 1:
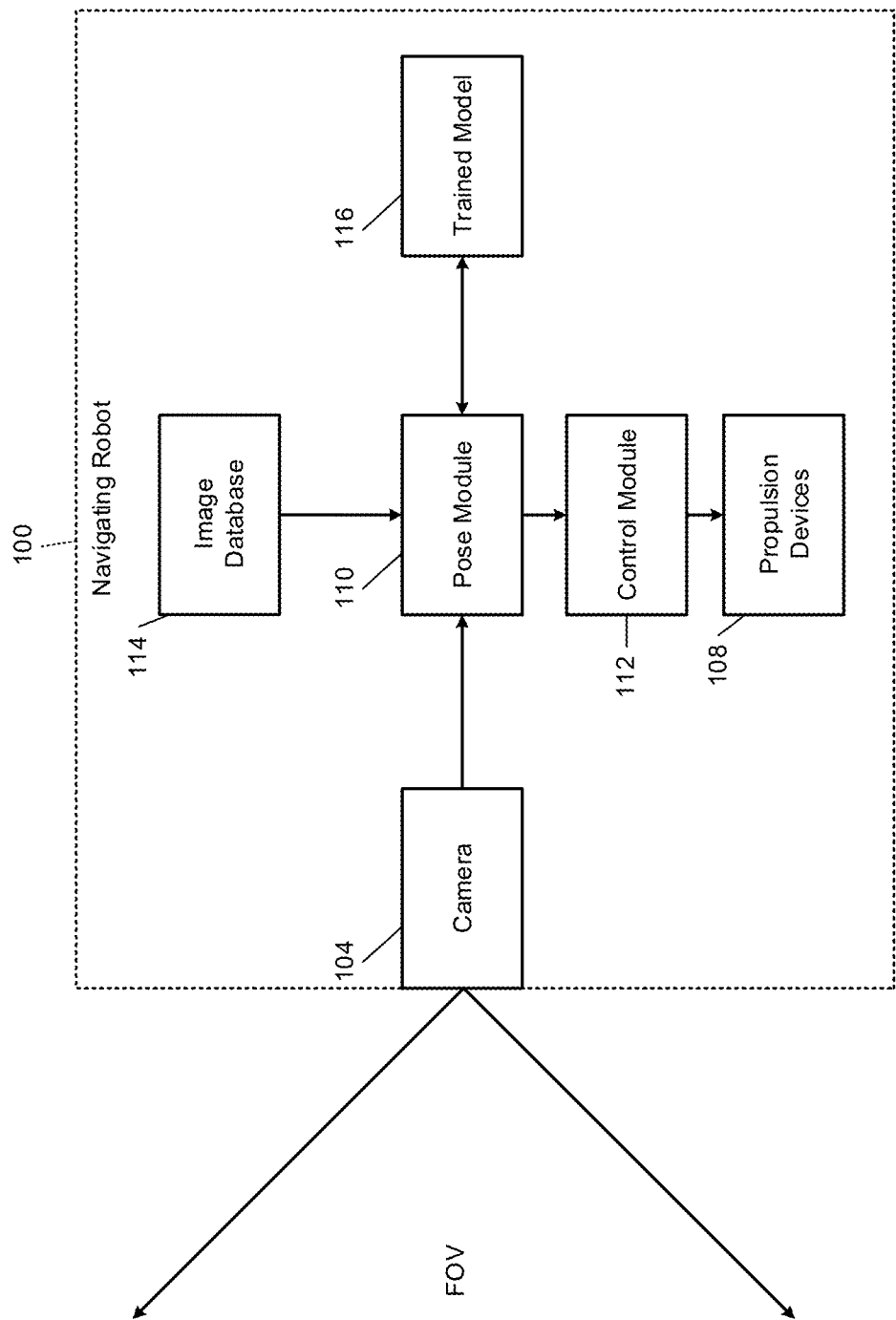
FIG. 1 is a functional block diagram of an example implementation of a navigating robot.

FIG. 1 is a functional block diagram of an example implementation of a navigating robot 100. The navigating robot 100 is a vehicle. The navigating robot 100 includes a camera 104 that captures images within a predetermined field of view (FOV) in front of the navigating robot 100. The predetermined FOV is less than 360 degrees around the navigating robot 100. The navigating robot 100 may have less than a full 360 degree FOV around the navigating robot 100. The operating environment of the navigating robot 100 may be an indoor space or an indoor space.

The camera 104 may be, for example, a grayscale camera, a red, green, blue (RGB) camera, or another suitable type of camera. In various implementations, the camera 104 may also capture depth (D) information, such as in the example of a grayscale-D camera or a RGB-D camera. The camera 104 may be fixed to the navigating robot 100 such that the orientation of the camera 104 relative to the navigating robot 100 remains constant.

The navigating robot 100 includes one or more propulsion devices 108, such as one or more wheels, one or more treads/tracks, one or more moving legs, one or more propellers, and/or one or more other types of devices configured to propel the navigating robot 100 forward, backward, right, left, up, and/or down. One or a combination of two or more of the propulsion devices 108 may be used to propel the navigating robot 100 forward or backward, to turn the navigating robot 100 right, to turn the navigating robot 100 left, and/or to elevate the navigating robot 100 vertically upwardly or downwardly.

The navigating robot 100 includes a pose module 110 configured to determine a (present) 6 dimension of freedom (6 DoF) pose of the navigating robot 100 based on input from the camera 104 and using a trained model 116. The 6 DoF pose incudes a three dimensional (3D) position of the navigating robot 100 and a 3D orientation of the navigating robot 100. The 6 DoF pose may be a relative pose or an absolute pose of the navigating robot 100. A relative pose may refer to a pose of the navigating robot 100 relative to one or more objects in the environment around the navigating robot 100. An absolute pose may refer to a pose of the navigating robot 100 within a global coordinate system.

To determine a relative pose, the pose module 110 may select an image from an image database 114 that most closely matches a (present) image from the camera 104. The pose module 110 may determine vector representations of the image and the selected image and determine a difference between the vector representations. The pose module 110 may determine the pose of the navigating robot 100 relative to one or more objects within the images by inputting the difference to the trained model 116.

To determine an absolute pose, the pose module 110 may determine a vector representation of the image. The pose module 110 may determine the pose of the navigating robot 100 by inputting the vector representation to the trained model 116.

The camera 104 may update at a predetermined frequency, such as 60 hertz (Hz), 120 Hz, or another suitable frequency. The trained model 116 may generate a pose each time the input from the camera 104 is updated.

The training of the trained model 116 is performed similarly or identically for both absolute and relative pose determination. The trained model 116 is stored in memory of the navigating robot 100. Training of the trained model 116 is discussed below. Stated generally, the trained model 116 is trained adversarially.

A control module 112 is configured to control the propulsion devices 108 to navigate, such as from a starting location to a goal location, based on the pose. For example, based on the pose, the control module 112 may determine an action to be taken by the navigating robot 100. For example, the control module 112 may actuate the propulsion devices 108 to move the navigating robot 100 forward by a predetermined distance under some circumstances. The control module 112 may actuate the propulsion devices 108 to move the navigating robot 100 backward by a predetermined distance under some circumstances. The control module 112 may actuate the propulsion devices 108 to turn the navigating robot 100 to the right by the predetermined angle under some circumstances. The control module 112 may actuate the propulsion devices 108 to turn the navigating robot 100 to the left by the predetermined angle under some circumstances. The control module 112 may not actuate the propulsion devices 108 to not move the navigating robot 100 under some circumstances. The control module 112 may actuate the propulsion devices 108 to move the navigating robot 100 upward under some circumstances. The control module 112 may actuate the propulsion devices 108 to move the navigating robot 100 downward under some circumstances.

Figure 2:
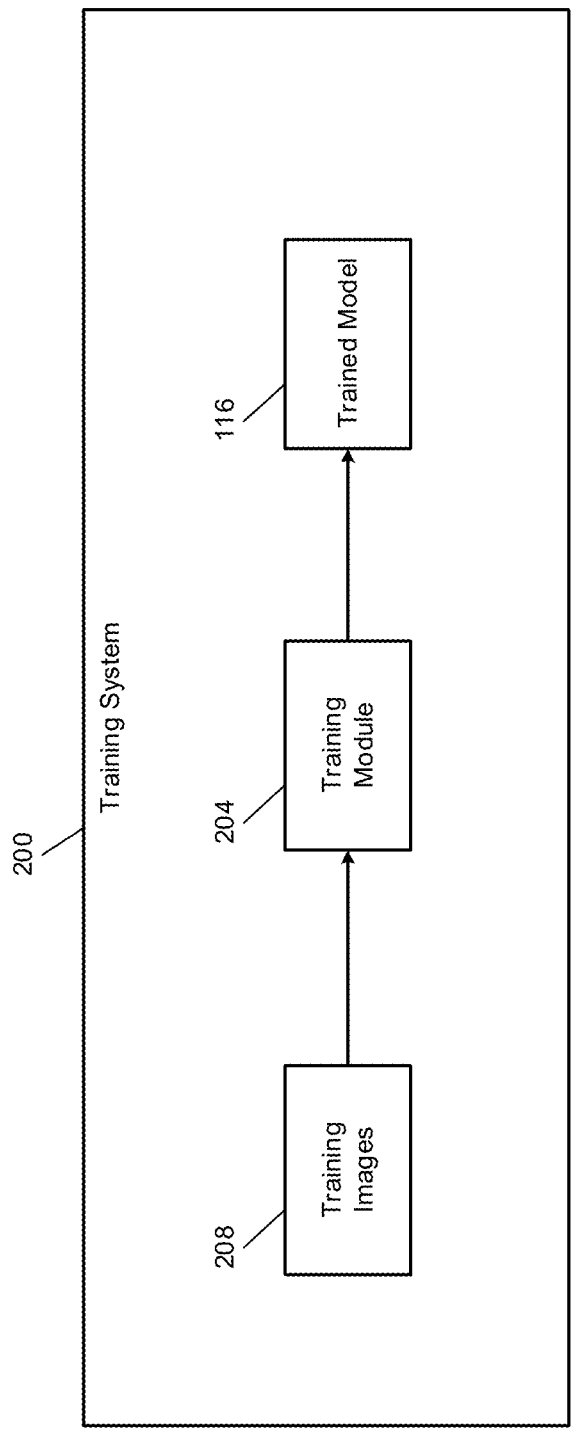
FIG. 2 is a functional block diagram of an example training system for training and generating a trained model for visual navigation by navigating robots.

FIG. 2 includes a functional block diagram of an example training system 200 for training and generating the trained model 116 for pose estimation, such as the navigating robot 100. A training module 204 adversarially trains the trained model 116 using a set of training images 208 stored in memory as discussed further below.

Figure 3:
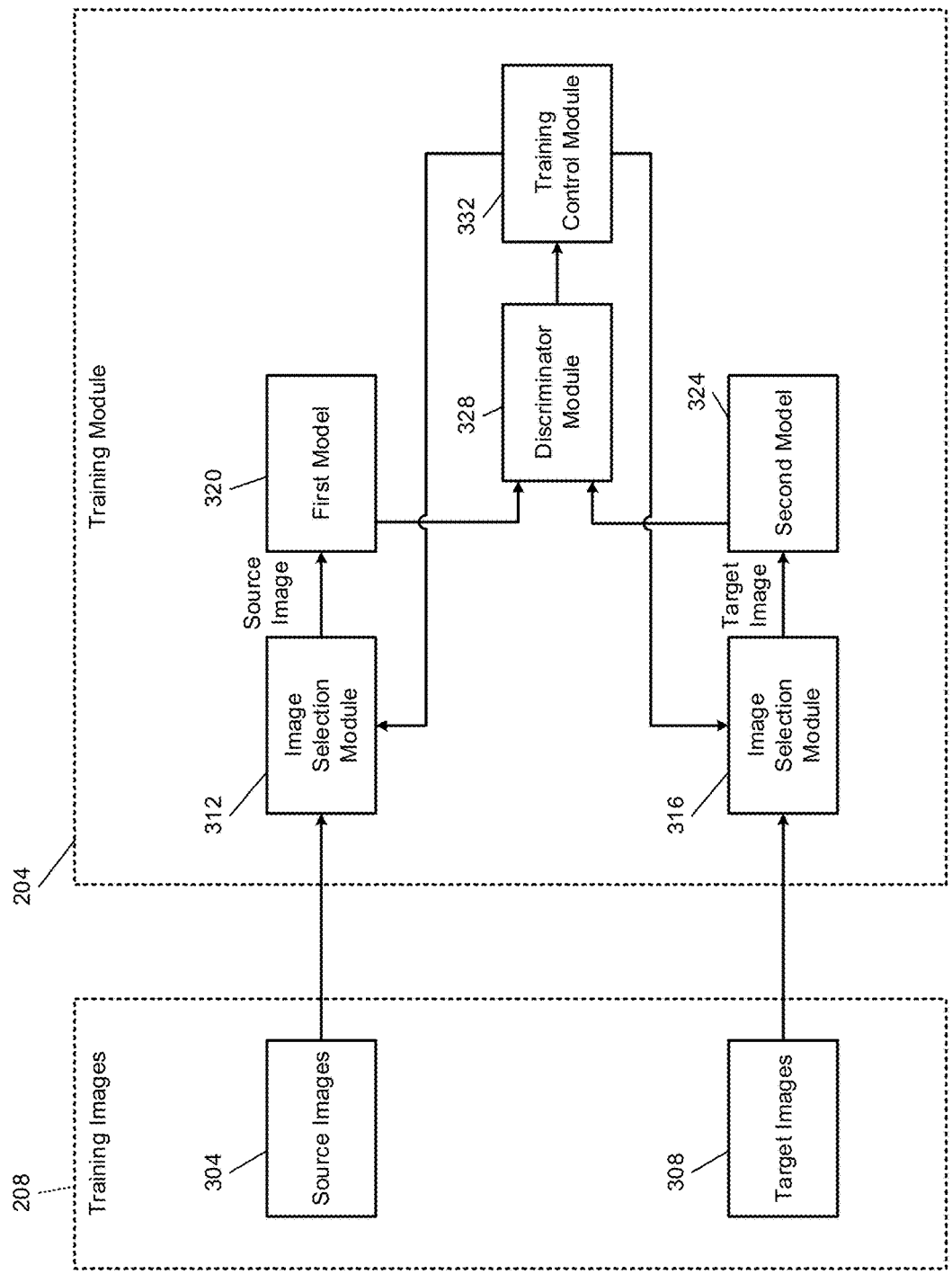
FIGS. 3-4 include functional block diagrams of an example implementation of a training module.
Figure 4:
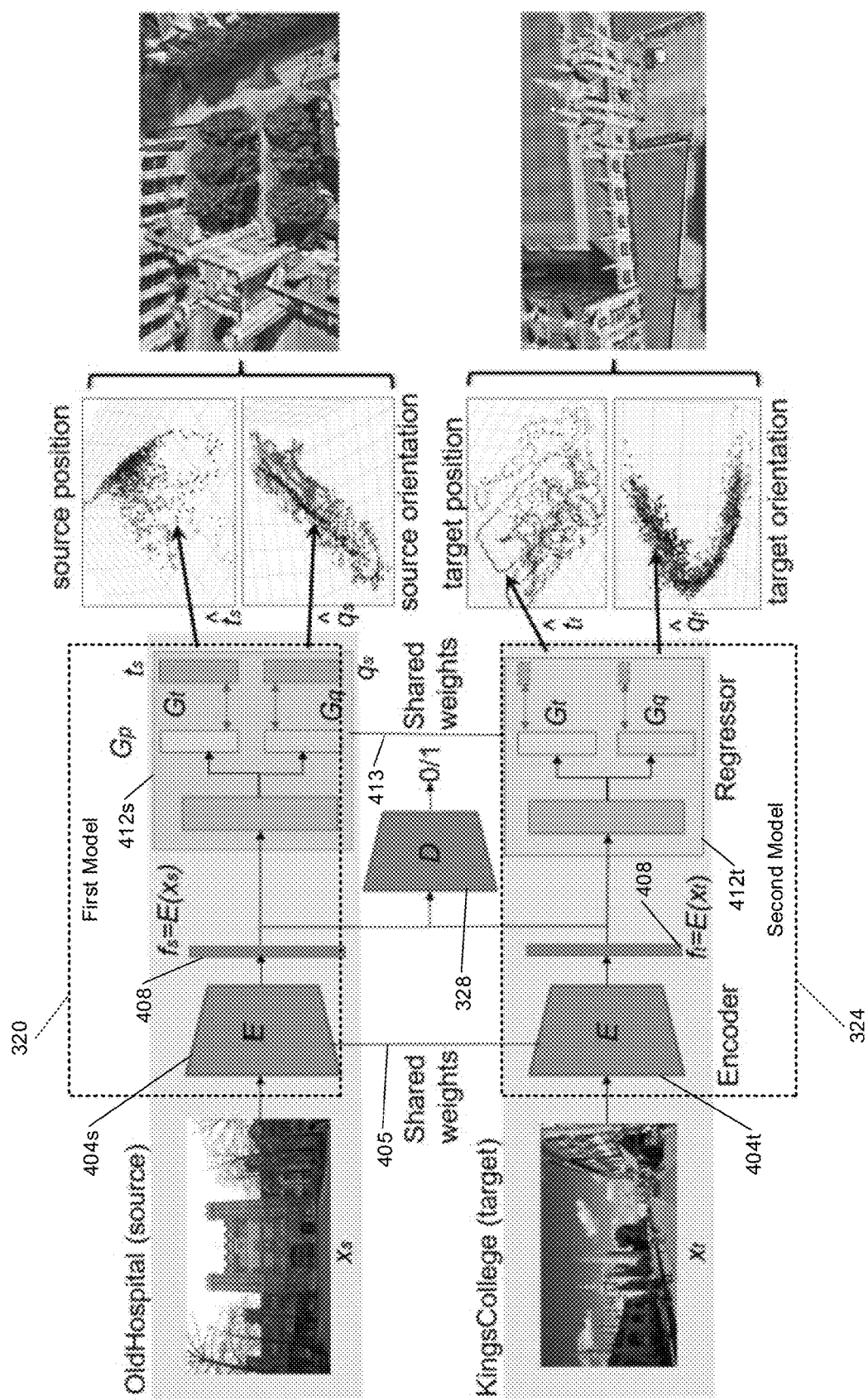

FIGS. 3 and 4 are functional block diagrams of example implementations of the training module 204. The training images 208 include images from at least two different domains, such as a source domain and a target domain. Images of the source domain are different than images of the target domain in that the domains are images of different environments taken at different locations (i.e., the source and target domain images depict different scenes). Source images are represented by 304 in FIG. 3 (or $X_s$ in FIG. 4), while training images are represented by 308 in FIG. 3 (or $X_t$ in FIG. 4).

Image selection modules 312 and 316 select different ones of the source and target images 304 and 308 in response to input to select a different image. Each of the first and second (mathematical) models 320 and 324 includes an encoder module 404, a localizer module 408, and a regressor module 412. The encoder modules $404s$ and $404t$ extract visual feature vectors from the input images. The localizer modules 408 use their fully connected (FC) layers to map visual feature vectors to localization feature vectors. The regressor modules $412s$ and $412t$ use connected layers to regress poses (each including a position $\hat{t}$ and an orientation $\hat{q}$) based on the localization feature vectors. The first and second models 320 and 324 have shared weights 405 and 413. For example, the encoder modules $404s$ and $404t$ may share (use) the same weights 405. The regressor modules $412s$ and $412t$ may also share (use) the same weights 413.

A discriminator module 328 generates a discriminator output based on a comparison of outputs (e.g., the visual feature vectors) of the encoder modules 408. The discriminator module 328 may set the output to a first state (e.g., 1)

to indicate that the selected source and target images are from a different domain when the outputs of the encoder modules 408 are not the substantially the same. For example, the discriminator module 328 may determine a difference between the outputs of the encoder modules 408 and set the output to the first state when the difference (e.g., a magnitude of the difference) is less than a predetermined value. The discriminator module 328 may set the output to a second state (e.g., 0) to indicate that the selected source and target images are from the same domain when the outputs of the encoder modules 408 are substantially the same. For example, the discriminator module 328 may set the output to the second state when the difference (e.g., the magnitude of the difference) is greater than or equal to than the predetermined value. As discussed above, the source and target images are from different domains.

A training control module 332 controls the training. For example, when the discriminator output is in the first state (indicating that the source and target images are from different domains), the training control module 332 may adjust one or more of the weights (e.g., used by the encoder modules 404s and 404t, the regressor modules 412s and 412t, or both the encoder and regressor modules 404s and 404t and 412s and 412t). The training control module 332 may continue using the same set of source and target images and may continue to adjust one or more of the weights until the discriminator output is in the second state (indicating that the source and target images are from the same domain). This trains the first and second models 320.

When the discriminator output is in the second state (indicating that the weights have been adjusted such that the first and second models 320 and 324 have been trained to identify that the selected source and target images are from the same domain), the training control module 332 prompts one of the image selection modules 312 and 316 to select a different source or target image. The image selection modules 312 and 316 may select the source and target images randomly. In various implementations, the training control module 332 may prompt both of the image selection modules 312 and 316 to select a different image.

Once at least one different image has been selected, the training control module 332 may adjust one or more of the weights based on the discriminator output generated based on the outputs of the encoder modules 404s and 404t generated based on the then selected images. This trains the first and second models 320 and 324 based on different combinations of the source and target images 304 and 308.

Figure 5A:
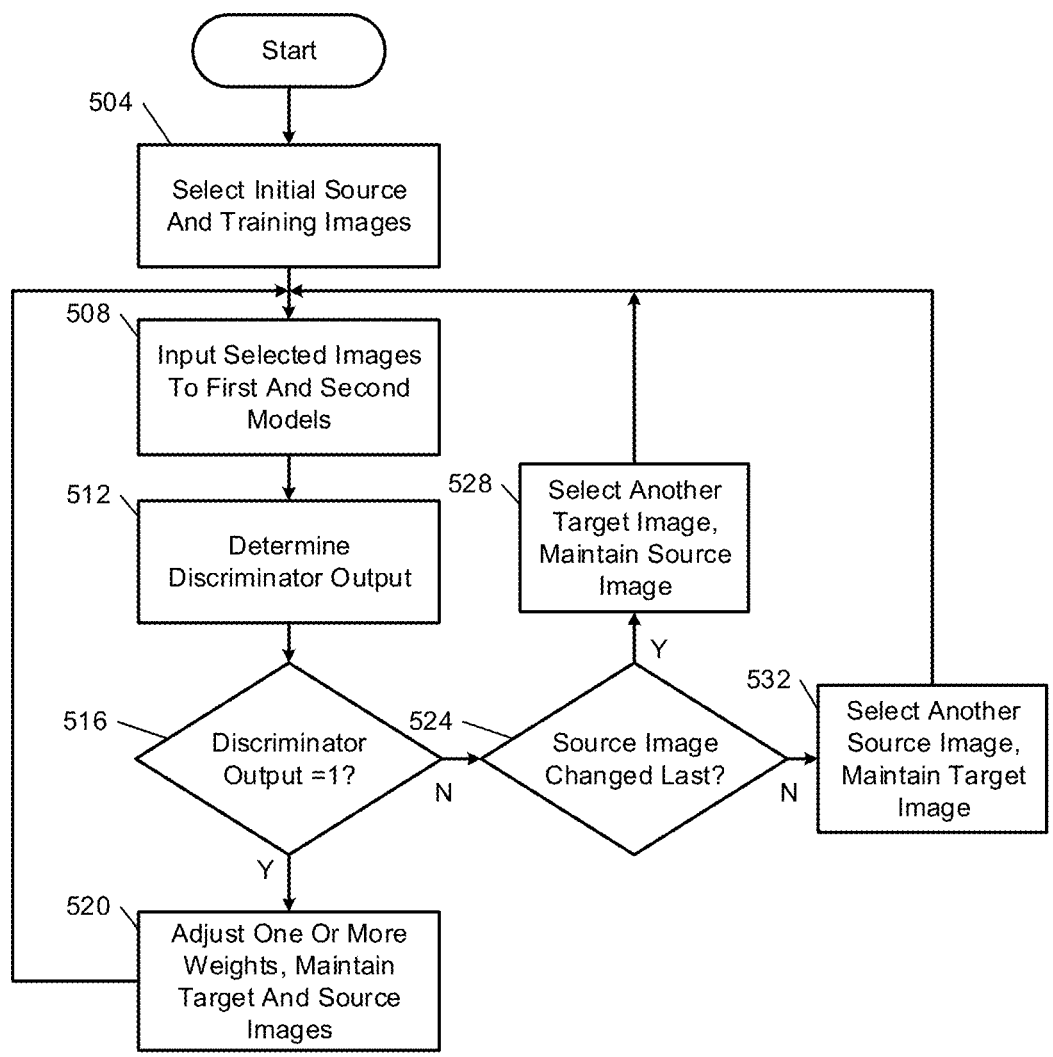
FIGS. 5A and 5B are flowcharts depicting an example method of adversarially training the training module.

FIG. 5A is a flowchart depicting an example method of adversarially training the training module 204. Control begins with 504 where the image selection modules 312 and 316 select initial source and target images. The image selection modules 312 and 316 may select the initial images randomly or predetermined ones (e.g., first) of the source and target images may initially be used. At 508, the selected source and target images are input to the first and second models 320 and 324 for training. The encoder modules 404s and 404S, the localizer modules 408, and the regressor modules 412s and 412t operate as described above and as further described below based on the input images.

At 512, the discriminator module 328 generates the discriminator output based on the outputs of the encoder modules 404s and 404t. At 516, the training control module 332 determines whether the discriminator output is set to the first state (e.g., 1). The discriminator module 328 sets the discriminator output to the first state when the outputs of the encoders indicate that the source and target images are from different domains. If 516 is true, at 520 the training control module 332 selectively adjusts (e.g., increases, decreases) one or more of the weights used by the first and second models 320 and 324 based on the discriminator outputs from 512, maintains the selected source and target images, and control returns to 508. In this manner, the first and second models 320 and 324 are trained to determine that the selected target and source images are from the same domain when, in fact, they are from different domains. If 516 is false, control transfers to 524.

At 524 (when the discriminator output is set to the second state falsely indicating that the selected source and target images are from the same domain), the training control module 332 determines whether the source image was the last one of the images to be changed. If 524 is true (the source image was the last one of the source and target images to be changed), at 528 the training control module 332 prompts the image selection module 316 to select another (different) target image, maintains the same source image, and control returns to 508 to continue the training based on the source image and the new target image. The image selection module 316 may select the other target image, for example, randomly or in a predetermined order.

If 524 is false (the target image was the last one of the source and target images to be changed), at 532 the training control module 332 prompts the image selection module 312 to select another (different) source image, maintains the same source image, and control returns to 508 to continue the training based on the new source image and the target image. The image selection module 312 may select the other source image, for example, randomly or in a predetermined order.

The example of FIG. 5A may be completed until at least one of: (a) all of the source images have been selected once; (b) all of the target images have been selected once; and (c) at least a predetermined number of different sets of source and target images have been selected. The completion of at least one of (a), (b), and (c) may be considered one epoch. The training module 204 may complete a predetermined number of epochs, such as 1,000, 5,000, 10,000, or another suitable number of epochs. Once the predetermined number of epochs has been completed, the first and second models 320 and 324 may be fully trained. Once fully trained, one of the first and second models 320 and 324 along with the weights may be stored as the trained model 116, for example, for visual navigation by the navigating robot 100.

Figure 5B:
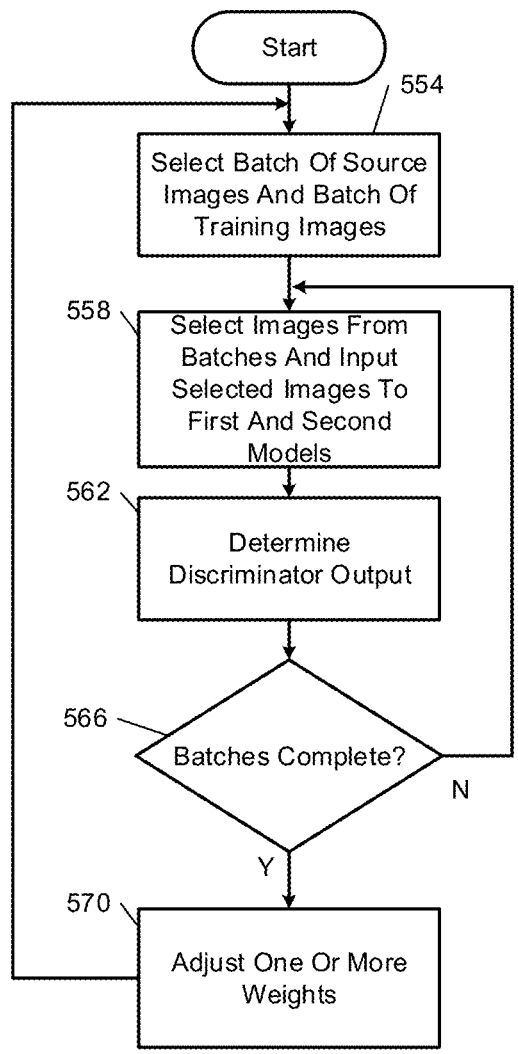

FIG. 5B is a flowchart depicting an example method of adversarially training the training module 204. Control begins with 554 where the image selection modules 312 and 316 selects a batch of a predetermined number (e.g., 32, 64, or another suitable number) of source images and a batch of the predetermined number of target images. The image selection modules 312 and 316 may select the images of the batches randomly or in a predetermined order (e.g., the first predetermined number of the source and target images may initially be used, etc.).

At 558, the image selection module 312 selects one source image and one target image from the batches, respectively, and inputs the selected images to the first and second models 320 and 324 for training. The encoder modules 404s and 404t, the localizer modules 408, and the regressor modules 412s and 412t operate as described above and as further described below based on the input images. At 562, the discriminator module 328 generates the discriminator output based on the outputs of the encoder modules 404s and 404t.

At 566, the training control module 332 determines whether the images of the batches have completed (e.g., the predetermined number of loops 558-566 have been performed). If 566 is true, at 570 the training control module 332 selectively adjusts (e.g., increases, decreases) one or more of the weights used by the first and second models 320 and 324 based on the discriminator outputs from 562 and control returns to 554 to select another batch of source and target images. In this manner, the first and second models 320 and 324 are trained to determine that the target and source images of the batches are from the same domain when, in fact, they are from different domains. If 566 is false, control returns to 558 for selection and inputting of another set of source and target images from the batches.

The example of FIG. 5B may be performed until at least one of: (a) all of the source images have been selected in a batch once; (b) all of the target images have been selected in a batch once; and (c) at least a predetermined number of different batches of source and target images have been selected. The completion of at least one of (a), (b), and (c) may be considered one epoch. The training module 204 may complete a predetermined number of epochs, such as 1,000, 5,000, 10,000, or another suitable number of epochs. Once the predetermined number of epochs has been completed, the first and second models 320 and 324 may be fully trained. Once fully trained, one of the first and second models 320 and 324 along with the weights may be stored as the trained model 116, for example, for visual navigation by the navigating robot 100.

Figure 8:
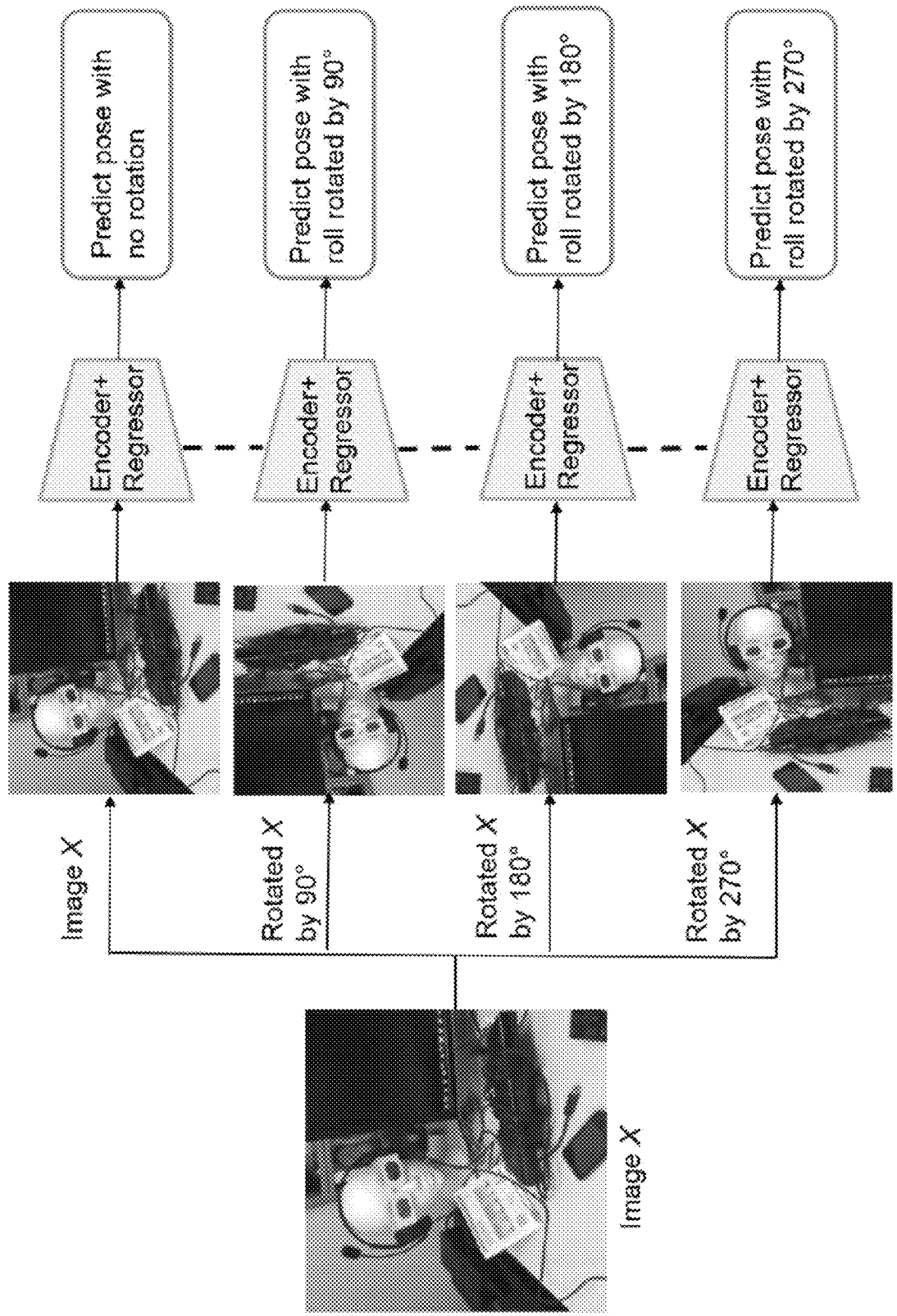
FIG. 8 includes example illustrations of geometric transforms on an image.

In various implementations, one or more geometric transformations may be performed on source and/or target images before inputting to the first and second models 320 and 324. The above training may also be performed using the one or more geometric transformed images. An example of a geometric transformation includes rotation of the image by a predetermined angle (e.g., 90 degrees, 180 degrees, 270 degrees, etc.) clockwise or counterclockwise. An example is shown in FIG. 8 where an image (e.g., a training image) provided on the left was rotated by 90 degrees, 180 degrees, 270 degrees, and 360 degrees (or 0 degrees). All four of the images with multiple different geometric transformations may be used for training. Such training may allow for the later receipt of images including the geometric transformation (e.g., by the navigating robot 100). While the example of geometric transformation is provided, other types of geometric transformations may be applied, such as translation, affine warping, distortion, and/or one or more other types of geometric transformations.

Generally speaking, given an (e.g., RGB) image $x \in \mathbb{R}^{h \times w \times 3}$, the pose module 110 predicts the camera pose $p=[t,q]$ given as a position vector $t \in \mathbb{R}^3$ and orientation $q$ using the trained model 116. The orientation $q$ can be described with multiple alternative representations, such as a 3×3 rotation matrix, quaternion and Euler angles. The present application involves quaternion representation.

A quaternion can be described as $q=[w,u] \in \mathbb{R}^4$ where $w$ is a real valued scalar and $u \in \mathbb{R}^3$. To ensure that the resulting quaternions lie on the unit sphere, the training module 204 may normalize the quaternions during training. As an alternative to the unit quaternion, the training module 204 may utilize their logarithm computed as follows $$q_{log} = \log q = \begin{cases} \frac{u}{\|u\|} \cos^{-1}(w), & \text{if } \|u\| \neq 0, \\ 0, & \text{otherwise,} \end{cases} \quad (1)$$

The logarithm representation may be less parametrized that quaternions on the unit sphere. The logarithm representation may relax the need to normalize the quaternions during training. The training module 204 may convert the logarithmic form back to unit quaternions using the following formula $$q = \left[\cos(\|q_{log}\|), \frac{q_{log}}{\|q_{log}\|} \sin(\|q_{log}\|)\right] \quad (2)$$

With the pose representation $p=[t, q]$, the training module 204 may use the following loss function to train a pose regression network.

$$L_p(\hat{p},p) = \|t-\hat{t}\|e^{-S_t} + S_t + \|q-\hat{q}\|e^{-S_q} + S_q, \quad (3)$$

where $\hat{p}=[\hat{t},\hat{q}]$, and $\hat{t}$ and $\hat{q}$ represent the predicted position and orientation, respectively. $s_t$ and $s_q$ are trainable parameters to balance both distances, and $\|\cdot\|$ is the $l_1$ norm.

Given an (e.g., RBG) image $x$, the encoder modules (also referred to as encoders) each include a deep network (e.g., a convolutional neural network or another suitable type of network) that extracts visual feature vectors from $x$, $f=E(x)$. The localizer modules (also referred to as localizers) use one or more fully convolutional (FC) layers to map a visual feature vector to a localization feature vector.

The regressor modules (also referred to as regressors) includes two separate connected layers that regress $\hat{t}$ and $\hat{q}$, respectively, to generate the estimated pose $\hat{p}=[\hat{t}, \hat{q}]$. In various implementations, the encoder modules may include a ResNet34 encoder, 1 FC layer localizer, and trained with a pose regression loss in equation (3), above.

Adversarial Pose Adaptation Network (APANet)

The training control module 332 adapts the pose regression models (e.g., the first and second models 320 and 324) from one (source) scene to another (target) scene. A source set $$D_s = \{(x_s^i, p_s^i)\}_{i=1}^{n_s}$$

of $n_s$ images with ground truth poses and a target set $$D_t = \{(x_t^j)\}_{j=1}^{n_t}$$

of $n_t$ images. A predetermined number of target images may include associated labels with poses, $$D_t^a = \{(x_t^j, p_t^j)\}_{j=1}^{n_t^a} \text{ where } n_a^i << n_t.$$

The source and target poses lie in different segments of the common coordinate system, i.e., $\{p_s\} \cap \{p_t\} \neq \emptyset$.

The pose adaptation network provides end-to-end training of the encoder module (E) and the regressor modules ($G_p$). Trained on labeled source images and unlabeled (and possibly some labeled) target images, the pose adaptation network enables an accurate adaptation of the trained model 116 (e.g., an adaptive pose regression (APR) model) to the target scene.

The training module 204 provides domain adaptation and reduces discrepancies between the source and target images. Domain adversarial networks learn scene-invariant image representations in a two player minimax game. The first player is a scene discriminator Gd trained to distinguish the feature representations of source images from target images, and the second player is the encoder E trained simultaneously to deceive the domain discriminator Gd.

The scene-invariant image representations $f=E(x)$ are learned in a minimax optimization procedure, where the training module 204 trains the encoder modules by maximizing the loss of the scene discriminator Gd, while the training module 204 trains the scene discriminator Gd by minimizing its own scene discrimination loss. The training module 204 learns a source version of the trained model and transfers it to target scene and minimizes the loss of the source pose regressor Gp.

The optimization problem of the training module 204 can be described by the following terms. Source pose regression may be defined on labeled source images $$L_{pose}^{s}(E, G_p) = \sum_{x_i \in D_s} L_p(G_p(E(x_i)), p_i), \quad (4)$$

where $\mathcal{L}_p$ is the regression loss function defined in equation (3), above. The discriminator module (also referred to as a scene discriminator) $G_d$ is trained to distinguish between feature representations of the source and target images, with the adversarial loss $$L_{adv}(G_d) = -\sum_{x_i \in D_s \cup D_t} L_d(G_d(E(x_i)), d_i), \quad (5)$$

where $\mathcal{L}_d$ is the cross-entropy loss function and di is the scene label (e.g., 0 for source images and 1 for target images).

Domain adaptation can be achieved with the two above terms in an unsupervised way. In absolute pose regression, scenes have no common pose space. According to the scene-driven scenario, supplied are a small number of labeled target images $D_t^a$. A regression term can be defined on $D_t^a$ $$L_{pose}^{t}(E, G_p) = \sum_{x_j \in D_t^a} L_p(G_p(E(x_t^j)), p_t^j), \quad (6)$$

where $\mathcal{L}_p$ is the regression loss function defined in equation (3) above. The pose regression loss then includes the source and target terms $\mathcal{L}_{pose}(E,G) = \mathcal{L}_{pose}^{s}(E,G_p) + = \mathcal{L}_{pose}^{t}(E,G_p)$. The total loss for training the adversarial pose adaptation network (APANet) can be represented as:

$$L_{APANet}(E, G_p, G_d) = L_{pose}(E, G_p) + \alpha L_{adv}(E, G_d), \quad (7)$$

where α denotes a hyper-parameter that controls the importance of the adversarial loss.

The training objective of the minimax game may be represented by the following:

$$E^*, G_p^* = \arg \min_{E, G_p} \max_{G_d} L_{APANet}(E, G_d, G_p). \quad (8)$$

Equation (8) may be solved by alternating between optimizing E, $G_p$, and $G_d$ until tye total loss (equation (7) converges. An example APANet architecture is presented in FIG. 4. Generally speaking, input to the APANet is a batch of source images and a batch of target images. The encoder modules (E) generate image representations f=E(x) for both batches. The discriminator module $G_d$ is trained on image representations f and scene labels d to distinguish source images from target images. The regressor modules Gp are trained on a full set of source image poses and, when available, a number of target scene poses. Position regressor Gt and orientation regressor Gq are trained separately. The position and orientation predictions are concatenated to produce the 6 DoF pose estimation, $\hat{p}=[\hat{t},\hat{q}]$, where $\hat{t}=G_t(E(x))$ and $\hat{q}=G_p(E(x))$.

Ground truth poses may be available for some target images, but not for others. Where ground truth poses are not available, unsupervised approaches may be pursued. One example is scene transposition. Assume knowing an aggregated information about the target scene. For example, the means and variances of target 6-DoF poses may be known. This information can be used to transpose target images into source scene space. The transposed pose can be described as p'=[t',q'], where a transposition vector t' is given by $$t' = \frac{\sigma_s}{\sigma_t}(t - \mu_t) + \mu_s$$

where $\mu_t$ and $\mu_s$ and $\sigma_t$ and $\sigma_s$ are the mean and variance of position vectors in the source and target scenes, respectively. Orientation vectors may be transposed similarly. With the transposed target poses, the training module 204 may train the first and second models using the source pose loss of equation (4) and the adversarial loss of equation (5). The above may be further extended to scene discretization where all 6-DoF poses are discretized into 50 bins.

Scene Adaptability

Adaptability may be used to measure the transferability of feature representations from one domain to another. Adaptability may be quantified by the error of a joint hypothesis h in both domains. The ideal joint hypothesis h* may be found by training on both source and target labeled images. The target labels may only be used regarding adaptability. If the joint model shows a low error on source and target test sets (comparable to the individual domain errors), an efficient transfer may be possible across domains.

A joint model may be trained in order to reason about adaptability of a source APR (adaptive pose regression) model to the target scene.

The APANet described above can be tested using publicly available camera relocalization benchmark datasets, such as the Cambridge Landmarks dataset and the 7Scene dataset. A predetermined split of training set and testing set may be used. Cambridge Landmarks is an outdoor dataset collected in four sites around Cambridge University. The images were collected using a Google mobile phone while pedestrians walk. The images have a resolution of 1920×1080, and the ground truth pose is obtained through VisualSFM software. Each site corresponds to one scene: Old Hospital, King's College, St. Mary's Church, and Shop Facade. The 4 scenes can be used to form 12 pose adaptation tasks, by enumerating all possible source and target pairs.

7Scene is an indoor dataset for camera relocalization and trajectory tracking. It was collected with a handheld RGB-D camera. The ground truth pose is generated using the Kinect Fusion approach. The dataset is captured in 7 indoor scenes. 12 adaptation tasks can be formed with chess selected as a pivot scene. It constitutes 6 Chess→X tasks and 6 X→Chess tasks, where X is one of the six remaining scenes: Fire, Heads, Office, Pumpkin, Red Kitchen or Stairs.

The APANet can be implemented in PyTorch. The encoder modules (E) may be tuned on the ResNet-34 network. The pose regressor Gp and the scene discriminator $G_d$ may be trained from scratch. Gp may include a FC localizer with 1024 nodes and two separate layers Gt and Gq, to regress position and orientation vectors, with 256 nodes each. Scene discriminator $G_d$ may include three FC layers with 1024, 256 and 64 nodes, interleaved with rectified linear unit (ReLu) layers, with a drop-out of 0.5.

In the training phase, a batch of source images and a batch of target images are input to tune the encoders E and to train scene discriminator $G_d$ and pose regressor Gp. In the testing phase, only the encoders E and pose regressors Gp are used. A target image xt is fed to the network and its pose is estimated as Gp(E(xt)). An Adam optimizer may be used to train the APANet. Training may be performed with a learning rate of $10^{-5}$ and a batch size of 16 images. Parameters st and sq may be initialized in the pose loss of equation (3) with 0 and −3.0 respectively. Image pre-processing may be performed. In some datasets (e.g., the Cambridge Landmarks dataset), resizing of each image to a predetermined size (e.g., 256 pixels along the shorter side) may be performed. Each image may also be normalized, such as with the mean and standard deviation computed from the ImageNet dataset.

For the training phase, the images may be (e.g., randomly) cropped to 224×224 pixels. For the testing phase, the images may also be cropped to 224×224 pixels at the center of the image. The training images are shuffled before they are fed to the network.

For all scene adaptation tasks, the two APANet versions discussed above may be compared with two baselines. First, the joint model may be trained on source and target train sets. This model is an indicator of adaptability of the source APR model to target scene. A low error on source and target test sets would suggest that a model generalization is possible and there exists a joint model performing well on both scenes. Second, as the true baseline, a semi-supervised (SS) relaxation of the joint model may be used where a fraction of the target training set available for training. The fraction may be denoted v and vary between 0 (source scene only) and 1 (the joint model).

The third model may be a pose-driven APANet trained with v target poses. This model can be considered as the SS baseline extended with adversarial learning of scene-invariant image representations. Finally, we also include results of APANet with scene transposition, where the target pose means and variances are used to transpose unlabeled target images into the source pose space, before training the APANet in the unsupervised mode.

The joint model may give an estimate of the smallest error the optimal joint model could achieve on the target scene. It serves as an indicator for the SS baseline and the pose-driven APANet. Both methods may be exposed to the trade-off between ratio v and accuracy drop with respect to the joint model. In the following, the SS baseline will be compared with APANet for the same values of v, in order to measure the size of target supplement sufficient to ensure an efficient pose adaptation.

Table 1 reports evaluation results for 12 adaptation tasks defined on the Cambridge Landmarks dataset. For each task, the table reports the transposed model error, the joint model error and the SS and APANet errors for the selected value v=0:05, which corresponds to 5% of target ground truth poses available for training. In all tasks, the joint model error is small and comparable to the individual scene model errors.

TABLE 1

| Dataset | Method | Old | King | StMary | Shop |
|---|---|---|---|---|---|
| Old | Transposed |  | 14.04/22.12 | 21.81/47.22 | 22.12/36.33 |
|  | Joint |  | 1.46/4.78 | 2.30/7.46 | 2.51/7.53 |
|  | SS, v = 0.05 |  | 7.36/14.03 | 7.24/12.19 | 6.47/13.71 |
|  | APANet, v = 0.05 |  | 4.21/6.83 | 3.82/9.54 | 3.56/9.37 |
| Kings | Transposed | 12.77/15.31 |  | 17.09/44.02 | 8.17/21.62 |
|  | Joint | 1.55/5.05 |  | 2.19/6.65 | 1.32/4.58 |
|  | SS, v = 0.05 | 6.74/14.92 |  | 6.76/15.84 | 6.52/13.10 |
|  | APANet, v = 0.05 | 3.74/8.27 |  | 3.88/10.18 | 2.61/8.63 |
| StMarys | Transposed | 12.34/22.01 | 11.96/17.32 |  | 10.13/23.21 |
|  | Joint | 2.40/7.80 | 2.23/6.85 |  | 2.05/7.70 |
|  | SS, v = 0.05 | 7.18/19.00 | 7.07/14.37 |  | 5.95/13.44 |
|  | APANet, v = 05.05 | 4.84/11.30 | 4.00/8.11 |  | 3.92/9.25 |
| Shop | Transposed | 12.64/19.76 | 15.49/21.08 | 20.39/51.37 |  |
|  | Joint | 2.46/7.69 | 1.49/5.91 | 2.13/7.65 |  |
|  | SS, v = 0.05 | 8.12/15.91 | 7.64/13.00 | 6.83/17.41 |  |
|  | APANet, v = 0.05 | 3.64/10.19 | 3.84/8.40 | 3.73/10.64 |  |

The joint position errors vary from 1.32 m for KingsCollege and ShopFacade to 2.81 m for OldHospital and ShopFacade. The orientation error varies between 4.58° for KingsCollege and ShopFacade and 7:80° for St. Marys Church and Old Hospital adaptation. This suggests a good adaptability across scenes.

For the ratio v=0:05, APANet performs much better than the SS baseline. Averaged over 12 adaptation tasks, the APANet position error is 46.8% lower than the SS baseline position error. Similarly, the APANet orientation error is on average 37.9% lower than the SS baseline orientation error.

Figure 6:
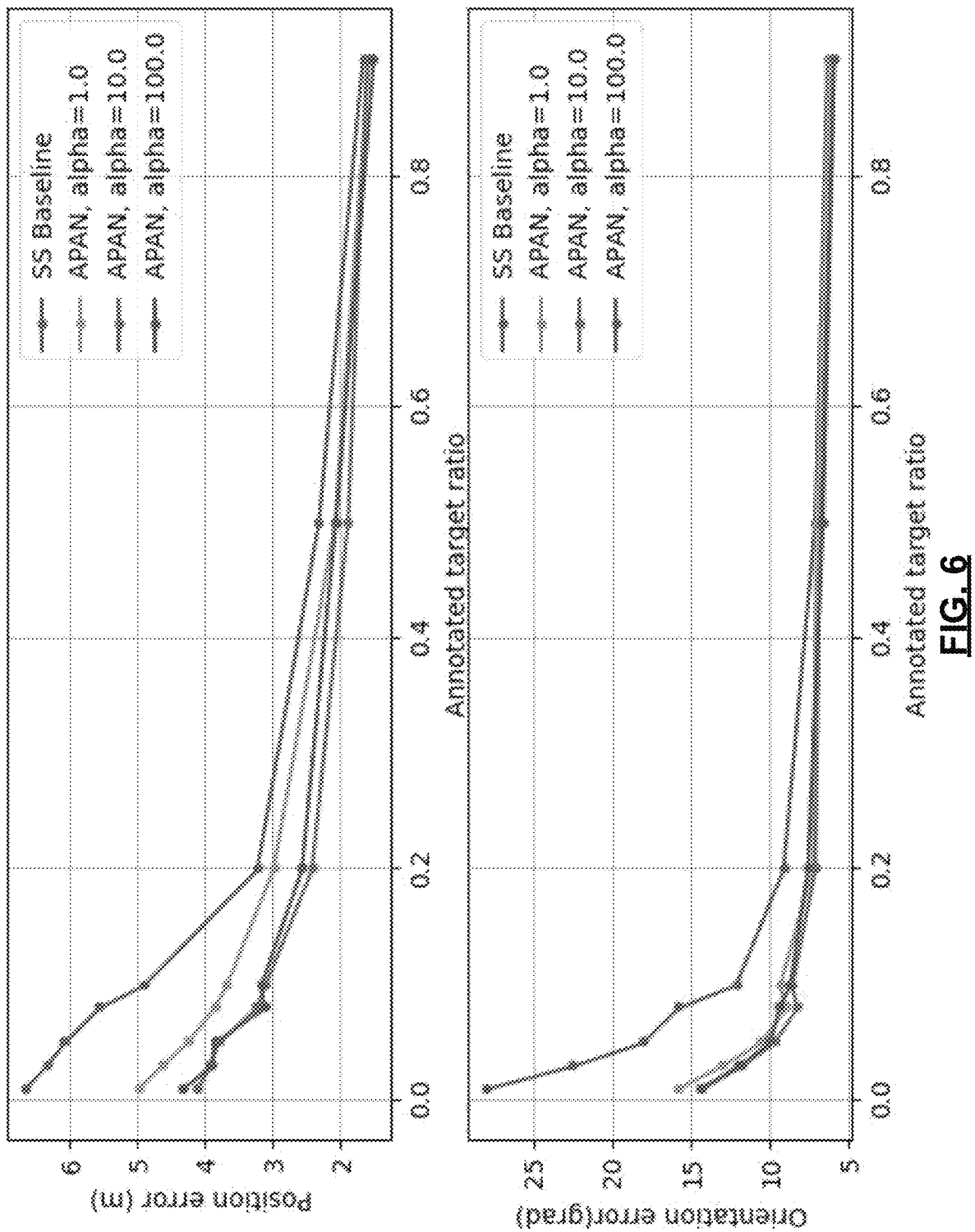
FIG. 6 includes example graphs of position error and orientation error for various networks versus annotated target ratio (v)

FIG. 6 includes example graphs of position error and orientation error for the various networks versus annotated target ratio (v). FIG. 6 gives an aggregated view by averaging over all 12 adaptation tasks. It compares the SS baseline and APANet errors for ratio v varying between 0.01 and 0.90. Additionally, the hyper-parameter a in the APANet loss (equation 7) is tested with values 1, 10 or 100 (in Tables 2 and 3 a is set to 10).

FIG. 6 shows little or no difference when target poses are available in training. Having 20% or more target poses is sufficient to train a joint model working well on both scenes. When the ratio v is reduced to 1%-5%, the advantage of APANet over the SS baseline becomes multifold. Learning scene invariant image representations accelerates the adaptation across scenes. Moreover it enables an accurate adaptation with a smaller target supplement.

Figure 7:
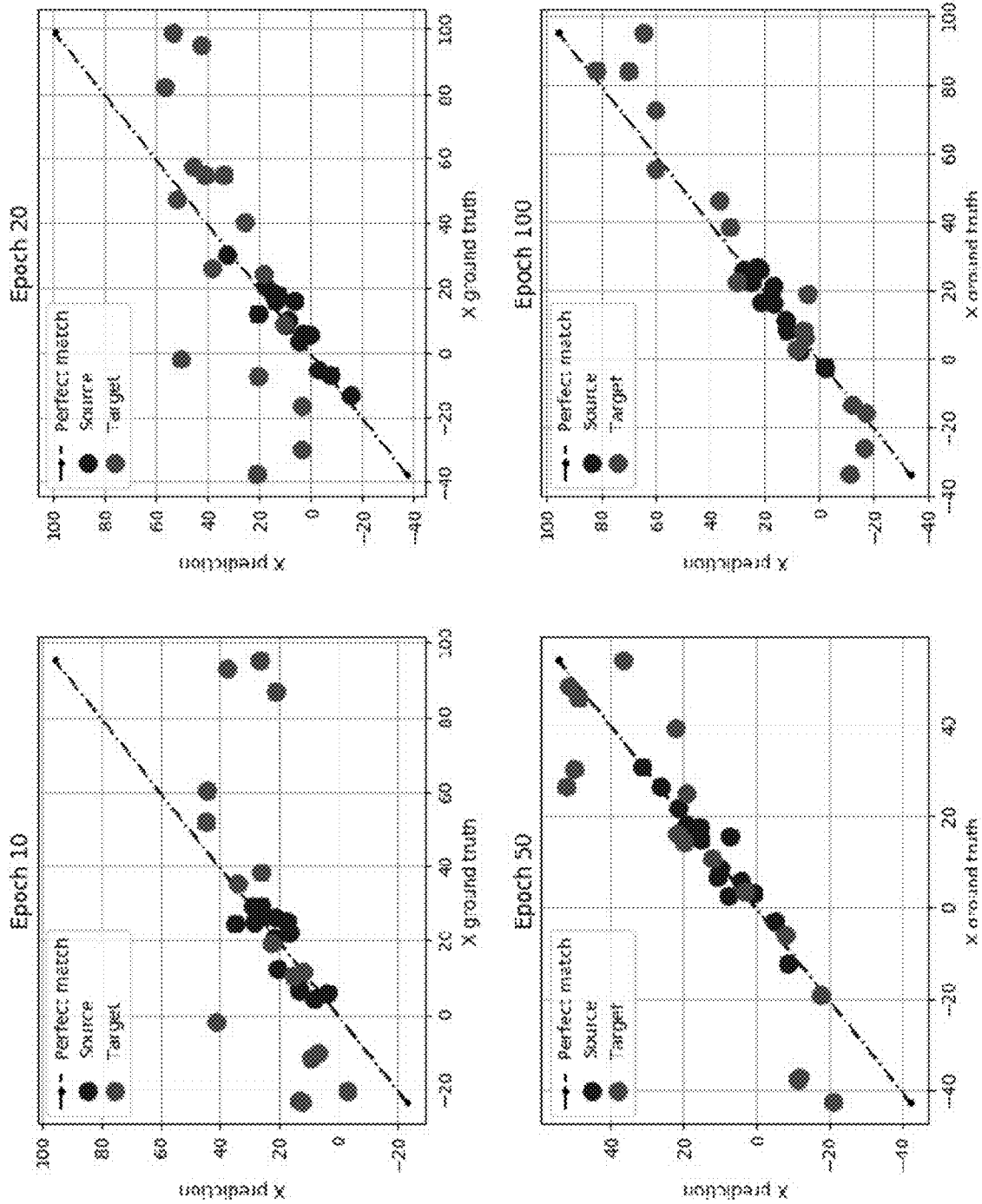
FIG. 7 visualizes the progress of learning of a source (first) model and scene-invariant image representations.

FIG. 7 visualizes the progress of learning the source (first) model and scene-invariant image representations. The dots represent source and target images in the current batch. The dotted diagonal line refers to a perfect match between a predicted value and the corresponding ground truth.

At early stages (e.g., after 10 epochs), the source APR model still includes inaccuracy. Target predictions may fall in the range of source values. As the source pose regressor improves during the training (e.g., after 20 and 50 epochs), the source dots become closer to the perfect match line.

After 100 epochs, the source APR model converges to an optimal performance. Moreover, APANet learns scene-invariant image representations as well as the scale and the range of the target scene. With more accurate predictions, target dots get closer to the perfect match line as well. At this point, the APR model is generalized over the two scenes.

Table 2 shows evaluation results for 12 adaptation tasks in the 7Scene dataset. For each task, the table reports the transposed model error, the joint model error, and the SS baseline and APANet errors for the selected value v=0:05.

TABLE 2

|   | Method | Fire | Head | Office | Pumpkin | Kitchen | Stairs |
|---|---|---|---|---|---|---|---|
| Chess→X | Transposed | 2.25/28.32 | 1.91/31.76 | 0.30/23.75 | 1.08/20.82 | 1.59/23.14 | 1.83/28.45 |
|  | Joint | 0.40/9.45 | 0.28/14.41 | 0.31/7.20 | 0.27/4.91 | 0.34/7.26 | 0.34/9.52 |
|  | SS, v = 0.05 | 1.31/19.08 | 1.04/24.62 | 0.89/18.36 | 0.82/11.15 | 1.01/17.59 | 1.03/20.12 |
|  | APANet, v = 0.05 | 0.63/14.67 | 0.44/17.03 | 0.42/10.62 | 0.39/6.87 | 0.43/10.35 | 0.47/12.28 |
| X→Chess | Transposed | 2.41/29.19 | 1.78/32.11 | 1.33/22.93 | 1.19/19.84 | 1.62/22.47 | 1.65/27.62 |
|  | Joint | 0.38/9.19 | 0.27/14.34 | 0.28/7.11 | 0.24/5.06 | 0.35/7.12 | 0.37/9.69 |
|  | SS, v = 0.05 | 1.16/21.61 | 1.08/27.20 | 0.98/15.62 | 0.79/13.71 | 0.83/16.45 | 0.95/17.05 |
|  | APANet, v = 0.05 | 0.58/14.23 | 0.48/19.52 | 0.41/11.30 | 0.36/7.01 | 0.44/10.36 | 0.49/12.54 |

In all adaptation tasks, a small error of the joint models may be observed. For the ratio v=0:05, the APANet performs better than the SS baseline. Averaged over all 12 adaptation tasks, the APANet position error is 53.4% lower than the SS baseline position error. Similarly, the APANet average orientation error is 35.5% lower that the SS baseline orientation error.

Figure 9:
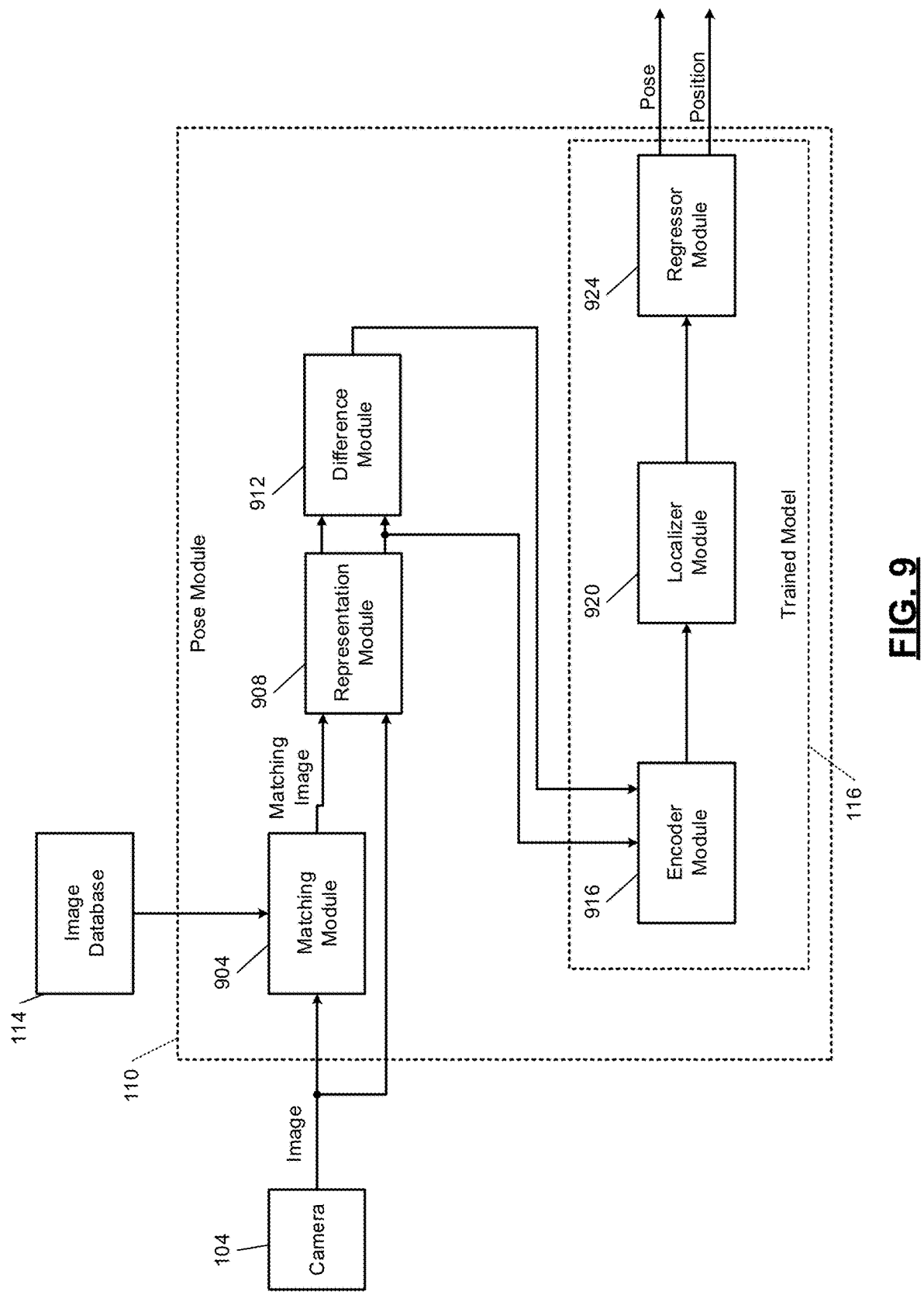
FIG. 9 includes a functional block diagram of an example implementation of a pose module and a trained model of a navigating robot.

FIG. 9 includes a functional block diagram of an example implementation of the pose module 110 which includes the trained model 116 of the navigating robot 100 that outputs a pose (position and orientation) of the camera 104. The pose module 110 may include a matching module 904 that accesses the image database 114 in the example of relative pose determination. The matching module 904 may compare an image received from the camera 104 with the images of the image database 114 to determine which one of the images of the image database 114 most closely matches the image from the camera 104.

A representation module 908 determines vector representations of the image from the camera 104 and the one of the images that most closely matches the image from the camera 104. A difference module 912 determines a difference (e.g., vector) based on differences between the vector representations.

The trained model 116 includes an encoder module 916, a localizer module 920, and a regressor module 924. The encoder module 916 is the same as the encoder module of the first and second models 320 and 324. The localizer and regressor modules 920 and 924 are the same as the localizer and regressor modules of the first and second models 320 and 324. The weights used by the trained model 116 result from the training of weights 405 and 413 of the first and second models 320 and 324.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" refers to, is a part of, or includes: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A training system, comprising:
a first model including:
a first encoder module configured to generate a first vector representation based on a first image from a first domain using first weight values;
a first localizer module configured to generate a second vector representation based on the first vector representation; and
a first regressor module configured to generate a first 6 degrees of freedom (DoF) pose of a first camera that captured the first image based on the second vector representation using second weight values;
a second model including:
a second encoder module configured to generate a third vector representation based on a second image from a second domain using the first weight values, wherein the second domain is different than the first domain;
a second localizer module configured to generate a fourth vector representation based on the third vector representation; and
a second regressor module configured to generate a second 6 DoF pose of a second camera that captured the second image based on the fourth vector representation and using the second weight values;
a discriminator module configured to, based on first and second outputs from the first and second encoder modules, generate a discriminator output indicative of whether the first and second images are from the same domain; and
a training control module configured to, based on the discriminator output, selectively adjust at least one of:
at least one of the first weight values; and
at least one of the second weight values.

2. The training system of claim 1 wherein the training control module is configured to adjust at least one of the first weight values until the discriminator output indicates that the first and second images are from the same domain.

3. The training system of claim 1 wherein the training control module is configured to input a different first image to the first model in response to the discriminator output indicating that the first and second images are from the same domain.

4. The training system of claim 1 wherein the training control module is configured to input a different second image to the second model in response to the discriminator output indicating that the first and second images are from the same domain.

5. The training system of claim 1 wherein the training control module is configured to, in response to the discriminator output indicating that the first and second images are from the same domain:

apply a geometric transformation to the first image, thereby generating a geometrically transformed image; and input the geometrically transformed image to the first model.

6. The training system of claim 5 wherein the geometric transformation includes a rotation of the image by a predetermined angle.

7. The training system of claim 5 wherein the geometric transformation includes one of translation, affine warping, and distortion.

8. The training system of claim 1 wherein the training control module is further configured to store in memory the first model, the first weight values, and the second weight values.

9. The training system of claim 1 wherein:
the first localizer module includes at least one fully connected layers configured to map the first vector representation to the second vector representation; and
the second localizer module includes the at least one fully connected layers configured to map the third vector representation to the fourth vector representation.

10. The training system of claim 1 wherein the first and second regressor modules each include at least two separate connected layers.

11. The training system of claim 1 wherein the first and second encoder modules each include an encoder and a fully connected layer localizer.

12. A vehicle comprising:
at least one propulsion device;
memory including:
the first model of claim 1; and
the first and second weight values;
a camera configured to capture an image;
a pose module configured to determine a 6 DoF pose of the camera based on the image and using the first model and the first and second weight values; and
a control module configured to actuate the at least one propulsion device based on the 6 DoF pose of the camera.

13. The training system of claim 1 wherein the first and second DoF poses are absolute 6 DoF poses.

14. The training system of claim 1 wherein the first and second DoF poses are relative 6 DoF poses.

15. The training system of claim 1 wherein the training control module is configured to adjust at least one of the first weight values based on minimizing a loss of the discriminator module.

16. The training system of claim 1 wherein the training control module is configured to adjust at least one of the second weight values based on minimizing a loss of the first and second regressor modules.

17. The training system of claim 1 wherein:
the first 6 DoF includes:
a first three dimensional position of the first camera that captured the first image; and
a first three dimensional orientation of the first camera that captured the first image; and
the second 6 DoF includes:
a second three dimensional position of the second camera that captured the second image; and
a second three dimensional orientation of the second camera that captured the second image.

18. A training method, comprising:
by a first model:
generating a first vector representation based on a first image from a first domain using first weight values;
generating a second vector representation based on the first vector representation; and
generating a first 6 degrees of freedom (DoF) pose of a first camera that captured the first image based on the second vector representation using second weight values;
by a second model:
generating a third vector representation based on a second image from a second domain using the first weight values,
wherein the second domain is different than the first domain;
generating a fourth vector representation based on the third vector representation; and
generating a second 6 DoF pose of a second camera that captured the second image based on the fourth vector representation and using the second weight values;
based on first and second outputs from the first and second models, generating a discriminator output indicative of whether the first and second images are from the same domain; and
based on the discriminator output, selectively adjusting at least one of:
at least one of the first weight values; and
at least one of the second weight values.

19. A non-transitory computer readable medium comprising code that, when executed by one or more processors, performs a training method, comprising:
by a first model:
generating a first vector representation based on a first image from a first domain using first weight values;
generating a second vector representation based on the first vector representation; and
generating a first 6 degrees of freedom (DoF) pose of a first camera that captured the first image based on the second vector representation using second weight values;
by a second model:
generating a third vector representation based on a second image from a second domain using the first weight values,
wherein the second domain is different than the first domain;
generating a fourth vector representation based on the third vector representation; and
generating a second 6 DoF pose of a second camera that captured the second image based on the fourth vector representation and using the second weight values;
based on first and second outputs from the first and second models, generating a discriminator output indicative of whether the first and second images are from the same domain; and
based on the discriminator output, selectively adjusting at least one of:
at least one of the first weight values; and
at least one of the second weight values.

20. A training system, comprising:
a first means for:
generating a first vector representation based on a first image from a first domain using first weight values;
generating a second vector representation based on the first vector representation; and
generating a first 6 degrees of freedom (DoF) pose of a first camera that captured the first image based on the second vector representation using second weight values;

a second means for:
  generating a third vector representation based on a second image from a second domain using the first weight values, wherein the second domain is different than the first domain;
  generating a fourth vector representation based on the third vector representation; and
  generating a second 6 DoF pose of a second camera that captured the second image based on the fourth vector representation and using the second weight values;
a third means for, based on first and second outputs from the first and second means, generating a discriminator output indicative of whether the first and second images are from the same domain; and
a fourth means for, based on the discriminator output, selectively adjust at least one of:
  at least one of the first weight values; and
  at least one of the second weight values.

21. A pose estimation training system, comprising:
a first model configured to generate a first 6 degrees of freedom (DoF) pose of a first camera that captured a first image from a first domain;
a second model configured to generate a second 6 DoF pose of a second camera that captured a second image from a second domain, where the second domain is different than the first domain;
a discriminator module configured to, based on first and second outputs from the first and second models, generate a discriminator output indicative of whether the first and second images are from the same domain; and
a training control module configured to, based on the discriminator output, selectively adjust at least one weight value shared by the first model and the second model.

22. The training system of claim 21 wherein the first model further comprises:
a first encoder module configured to generate a first vector representation based on the first image using first weight values;
a first localizer module configured to generate a second vector representation based on the first vector representation; and
a first regressor module configured to generate the first 6 degrees of freedom (DoF) pose of a first camera based on the second vector representation using second weight values.

23. The training system of claim 22 wherein the second model further comprises:
a second encoder module configured to generate a third vector representation based on a second image using the first weight values;
a second localizer module configured to generate a fourth vector representation based on the third vector representation; and
a second regressor module configured to generate a second 6 DoF pose of the second camera based on the fourth vector representation and using the second weight values.

24. The training system of claim 23 wherein the training control module is configured to selectively adjust the first model and the second model by adjusting at least one of:
at least one of the first weight values; and
at least one of the second weight values.

* * * * *